No. 724,345. PATENTED MAR. 31, 1903.
T. W. SLOANE.
MACHINE FOR CUTTING CANE.
APPLICATION FILED JUNE 19, 1901.
NO MODEL. 4 SHEETS—SHEET 1.

No. 724,345. PATENTED MAR. 31, 1903.
T. W. SLOANE.
MACHINE FOR CUTTING CANE.
APPLICATION FILED JUNE 19, 1901.
NO MODEL. 4 SHEETS—SHEET 3.

Witnesses:

Inventor
Thomas W. Sloane
By James L. Norris
Atty

No. 724,345. PATENTED MAR. 31, 1903.
T. W. SLOANE.
MACHINE FOR CUTTING CANE.
APPLICATION FILED JUNE 19, 1901.
NO MODEL. 4 SHEETS—SHEET 4.
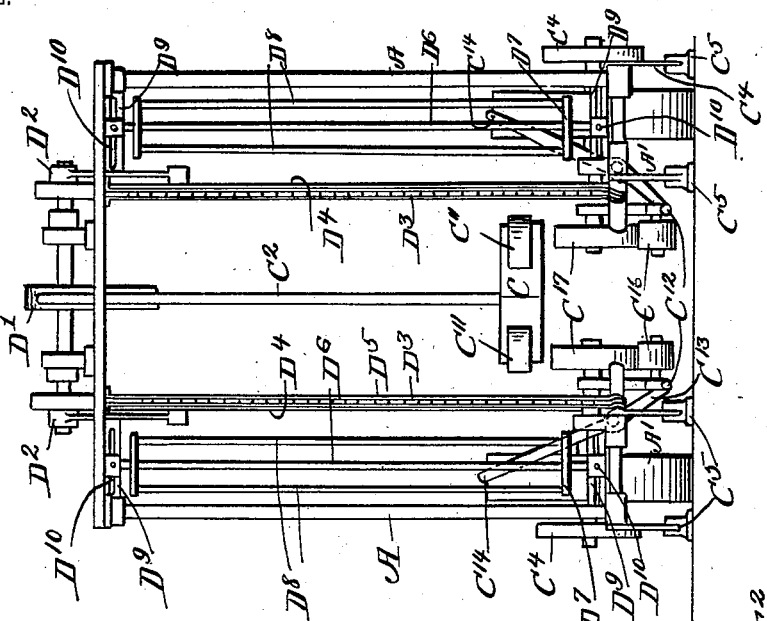
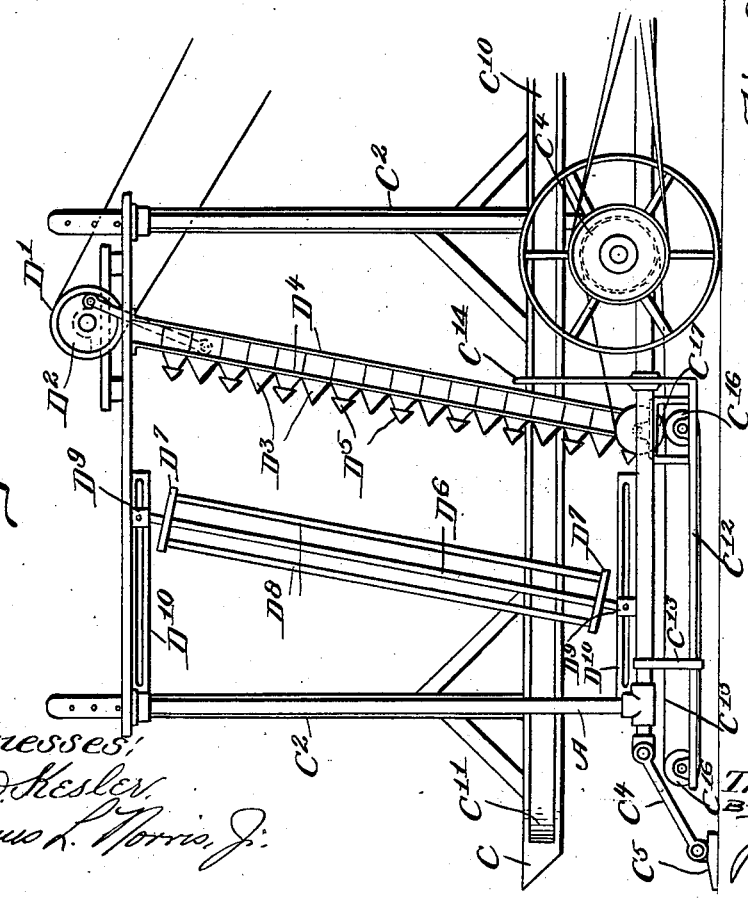
Witnesses:
C. D. Kesler.
James L. Norris, Jr.
Inventor
Thomas W. Sloane
By
James L. Norris.
Atty.

UNITED STATES PATENT OFFICE.

THOMAS WILSON SLOANE, OF EAST BUNDABERG, QUEENSLAND, AUSTRALIA.

MACHINE FOR CUTTING CANE.

SPECIFICATION forming part of Letters Patent No. 724,345, dated March 31, 1903.

Application filed June 19, 1901. Serial No. 65,193. (No model.)

*To all whom it may concern:*

Be it known that I, THOMAS WILSON SLOANE, a subject of the King of Great Britain, residing at School Lane, East Bundaberg, in the county of Cook, State of Queensland, and Commonwealth of Australia, have invented certain new and useful Improvements in Machines for Cutting Cane, (for which I have applied for a patent in Queensland, No. 5,866, filed January 28, 1901,) of which the following is a description.

This invention relates to improvements in machines for cutting sugar-cane whereby the double operation of cutting the cane at the top and at the root can be effectively carried out whether the crop be standing up or procumbent.

The machine is built on a tubular framework and is open in the front half, each side of which has a carrying and driving-wheel belt driven at a suitable speed—say from about one or two miles an hour—from an oil or other motor placed over two steering-wheels at the rear of the machine. In the center of the front gap is a plow-like spreader which parts the cane and bends the stools laterally and forward, so that the tops are dragged past guide-rollers and against vertically-reciprocating knives fixed on the lateral parts of the frame. At the back of the central gap are two vertical spindles carrying revolving knives that cut the cane close to the ground, the knife-drums being capable of sliding on square shafts to accommodate lumps in the ground and enable the operator to cut the cane where desired. The several canes fall on lateral traveling belts and are conveyed to the trucks at the rear. At the base of the front part are shoes attached to sloping bars which are intended to raise flat-lying cane to a cutting position.

Figure 1:
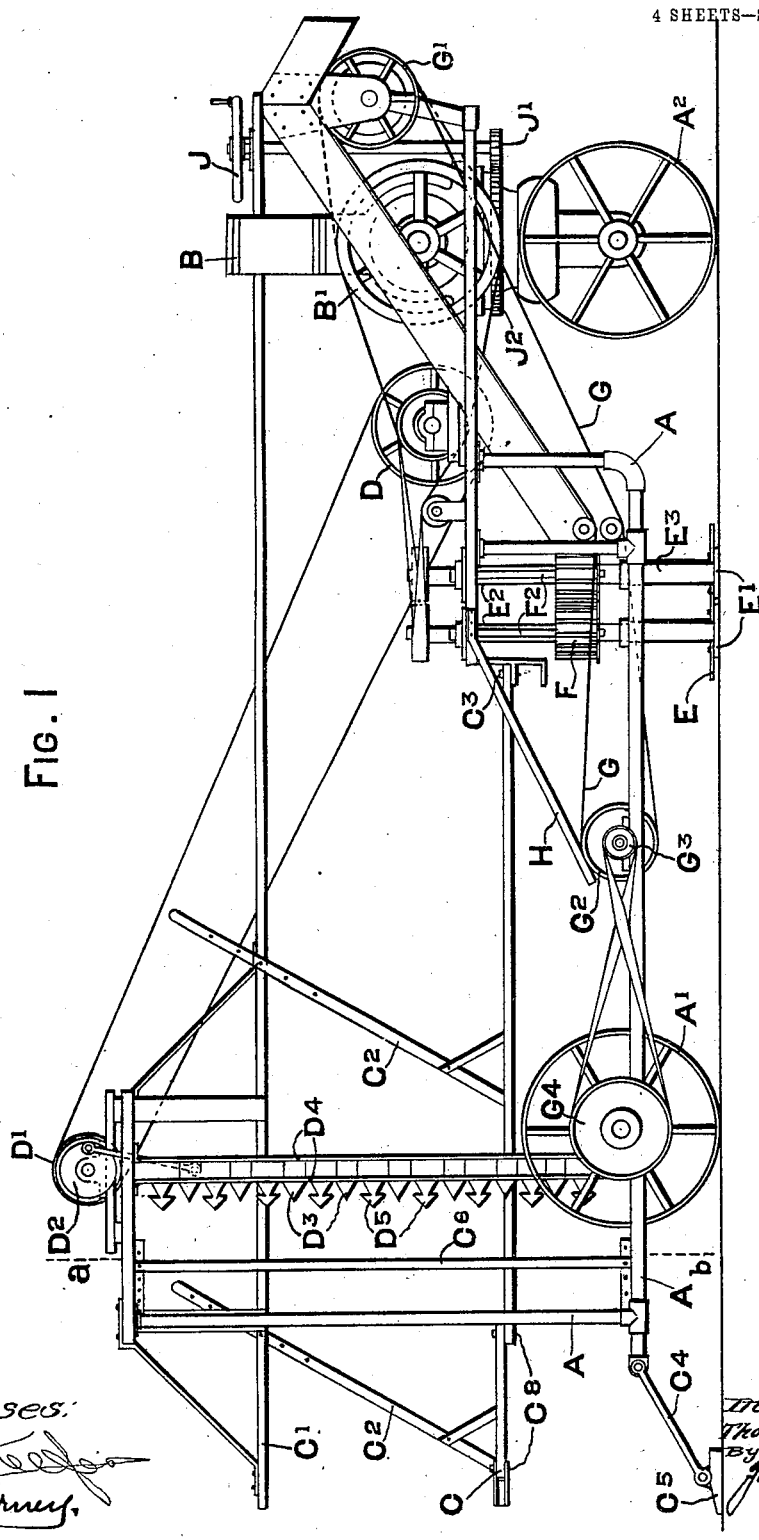
Figure 2:
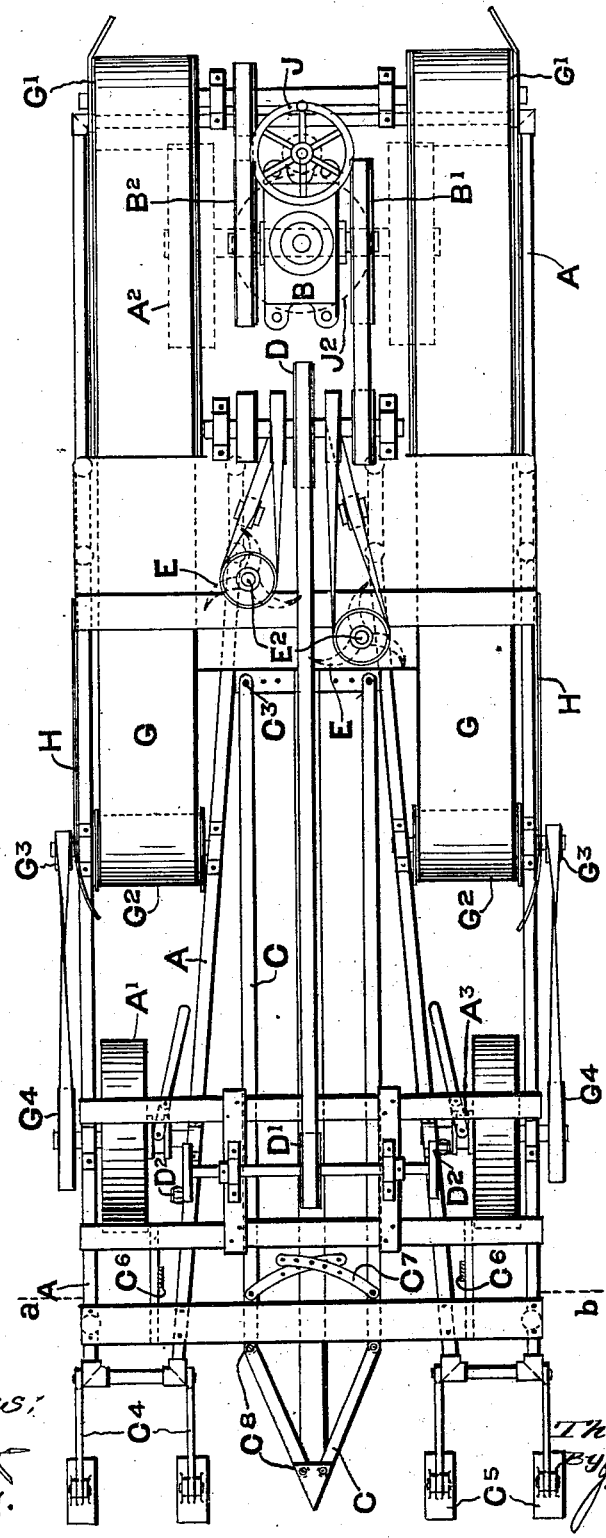
Figure 3:
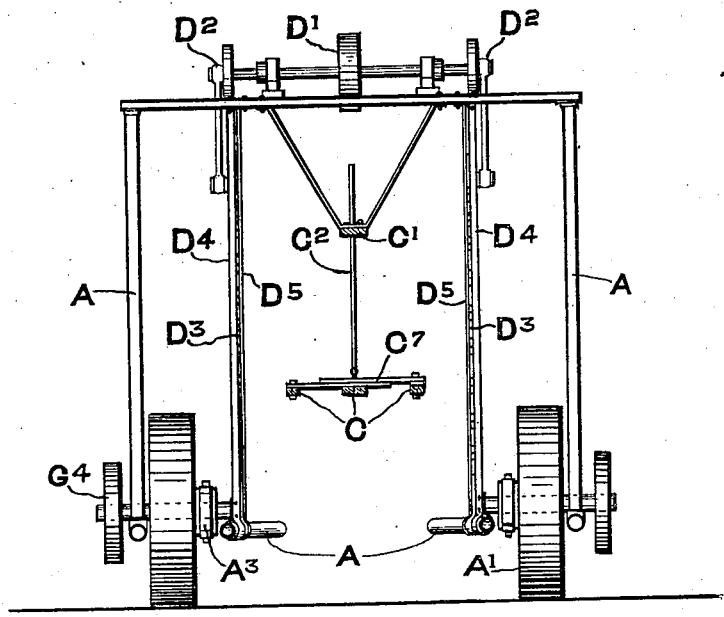
Figure 6:
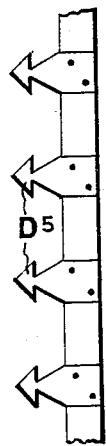
Figure 4:
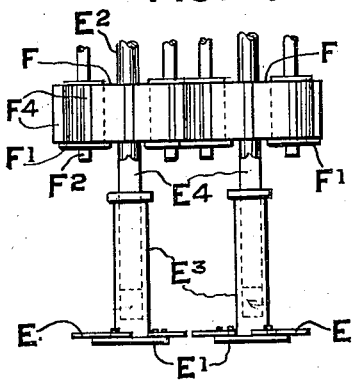
Figure 5:
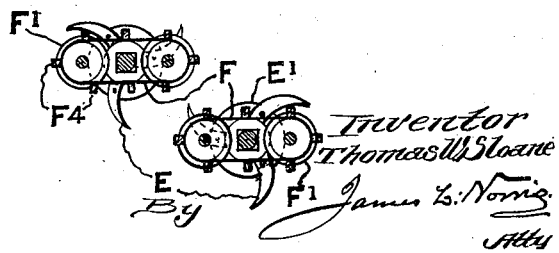

Referring to the accompanying drawings, Figure 1 is a side elevation; Fig. 2, a plan, a portion of the frame being removed for the sake of clearness; and Fig. 3, a section through the line $a\ b$, Fig. 2, illustrating my improvements. Figs. 4 and 5 are details of the ground-knives and of conveyer-belts for turning the ends of the cut cane clear of the shafts or on the elevators, being, respectively, a side elevation and plan. Fig. 6 is a detail of the fixed knives, across which topping knives or blades reciprocate. Figs. 7 and 8 are a side and a front end elevation, respectively, illustrating a modification of topping arrangement and fore carriage. Fig. 9 is a detail of internal belt in Fig. 5.

A is the main frame of the machine; $A'\ A^2$, the ground-wheels. The wheels $A'$ are on separate axles, and each has a clutch $A^3$ to engage in the boss of the wheels to facilitate the machine being turned around.

B is an oil-engine or other motor, and $B'\ B^2$ the driving-wheels.

C is the spreader, suspended from the upper frame $C'$ by the adjustable bars $C^2$ and is secured loosely on the main frame by pins $C^3$.

$C^4$ represents hinged arms provided with pivoted shoes $C^5$ for raising procumbent cane.

$C^6$ is the adjustable bar or gage for gaging the length of top to be cut off, preferably revolving in bearings $C^9$. The gage $C^6$ is adjustable in that it can be secured by pins or the like nearer or farther from the reciprocating and fixed topping-knives $D^3\ D^5$, and the distance of the gage from the knives predetermines the length of top to be cut off— that is to say, when the gage is set the tops cut off will all be the same or very nearly the same length, although the length of stalks of cane may vary.

In the forward part of the machine an adjustable spreader is suspended by adjustably-perforated links from a center bar above, which is attached at its rear end to the frame (not shown) and at its front end is stayed to the upper cross-bars. The spreader is formed with three longitudinal bars adjustably bolted at $C^3$ to the frame. Its front part has an iron point and inclined bars hinged, as at $C^8$, with adjustable bars $C^7$, as Fig. 2, so that its width may be adjusted. The object of the spreader is when the machine is propelled to force its way through the cane-stool, dividing the cane and causing it to pass on each side of the spreader and between the fore ends of the main frame. At each side of the formed gap are vertically-reciprocating knives $D^5$, Figs. 1 and 8, operated by cranks on the top, while in front of these knives, but adjustable as to position, are vertical bars or rollers or gages $C^6$. I may, however, provide a horizontal or diagonal gage, and consequently horizontal or diagonal cutters.

On the extreme fore ends of the main frame are sloping hinged arms carrying pivoted ground-shoes with the hinges nearer the back than the front, which yield to stones or other hard substances, and thus prevent the arms sticking into the ground as they progress. The object of the sloping hinged arms is to raise any procumbent cane and bring it into position to be cut by the topping cutters or knives, and the shoes are to guide the arms under fallen cane.

The cane passes between the spreader and lateral frames as the machine advances and is cut by the revolving ground-knives. The ground knives or cutters for cutting the cane near the root are attached to two disks secured to two vertical or nearly vertical and preferably telescopic shafts which revolve toward one another. Above the said knives or cutters are two conveyer-belts for turning the ends of the cut cane clear of the shafts or onto the elevators at the sides of the machine. When the ground is suitable, I provide an elevator G on each side of the machine, so as to convey the cut cane to drays or trucks at the rear, which may be taken off in broken country.

The spreader is adjustable vertically by the bars $C^2$, working in slots at $C^X$ in the upper frame $C'$ and in the brackets $o$. The spreader pushes the cane on each side outwardly and forwardly, causing the cane-stalks to come into contact with the gage, which bends and retards them until by the progress of the machine they pass the gage and spring on the knives $D^3$ $D^5$, where the tops are cut off. In short, the spreader is suspended in the recess at the forward end, space being left at each side to allow cane to be forced out by the spreader. A short stalk in a stool passes the gage before a long one in the same stool. An extra long stalk—say ten or twelve feet—would not be topped until it was about to be cut at the root by the ground-knives. The lateral adjustment of the spreader is very simple. The holes in which the pins or bolts $C^3$ are seated are shown in Fig. 2, and there are at least three holes on each side, so that the end of each side piece C may also, if necessary, be moved into other holes. The fore part of the spreader is also adjustable as to width by means of the arms $C^7$ and is hinged at $C^8$.

The topping cutters or knives are driven from the pulleys D and $D'$, the shaft of which latter has the crank-disks $D^2$ $D^2$, so as to reciprocate the knives $D^3$ in the guides $D^4$ over the fixed arrow-headed knives $D^5$. Instead of the knives $D^3$ shown I may use other cutting mechanism.

The ground knives or cutters E, Figs. 4 and 5, are secured on the disks $E'$ on telescopic shafts $E^2$, the said shafts having a square hollow portion $E^3$, sliding on a square portion $E^4$, raising the knives and disks.

F F are two short conveyer-belts with cross-slats $F^4$ over the knives E, traveling oppositely (and also oppositely to their corresponding knives) over the small flanged wheels $F'$ $F'$ on spindles $F^2$, suspended from the main frame A. The conveyers are driven by a small crossed driving-belt for each set from a pulley on $E^2$ to $F'$, Fig. 4, said crossed belts being under conveyer-belt F when in operation, as shown in outline in plan in Fig. 9.

G G are the lateral elevators for the cut cane.

$G'$ $G'$ are pulleys whose shaft is driven from the wheel $B^2$.

$G^2$ $G^2$ are pulleys on whose shafts are also the pulleys $G^3$, driving the wheels $G^4$ on the ground-wheels $A'$, and thus propelling the machine.

H is an adjustable guide-rod for turning the cane into a longitudinal position, or lengthwise on the elevator.

J is a hand-wheel, on the spindle of which is a cog-wheel $J'$, gearing with the circle-plate $J^2$ to guide the machine.

In Figs. 7 and 8 the revolving gage and the topping-knives are shown in a diagonal or inclined position, and the construction of forecarriages is slightly modified. Each gage is composed of two disks $D^7$, provided with central holes to allow it to revolve freely on the rod $D^6$, and said disks are connected together by four or more rods $D^8$. The gages are so constructed that they can be adjusted to right or left or to the front or rear by adjusting screw-bolts in the slotted plates $D^9$ $D^{10}$. On the outer sides of the spreader C are endless belts $C^{10}$, running on pulleys $C^{11}$ and driven by pulleys on the rear end of the machine. The object of the said belts is to engage with the cane and prevent the spreader from forcing any of the weaker stalks of cane to the ground as the machine progresses. In the said modification I also provide additional frames $C^{12}$, pivoted onto each side of the main frame $C^{13}$ and capable of adjustment to about four inches off the ground by means of the lever $C^{14}$. On the said frames $C^{12}$ are carried endless belts $C^{15}$ on pulleys $C^{16}$, the said belts engaging with any cane that the shoes $C^5$ may raise and directing it toward the topping-knives. The pulleys $C^{16}$ may be frictionally driven by wheels $C^{17}$, which latter may be driven by belts from the front ground-wheels.

The operation of my machine is as follows: On the machine being propelled through a stool of cane the spreader C causes a portion of the cane to pass on each side of it and between the fore ends of the main frame, and at the same time any cane lying toward the horizontal is raised by the arms $C^4$. As the cane-stalks pass the spreader the upper ends or tops come into contact with the revolving gages $C^6$, which bend them slightly until the machine has traveled a little farther, when the cane springs back onto the fixed knives D⁵. The shape of these knives causes the cane to be held for an instant, when the reciprocating cutters D³ cut off the tops the predetermined distance whatever the length of the cane may be. The cane (after being topped by the knives D³ D⁵) just before being cut at the root by the ground-knives stands (or is forced) at an angle sloping forwardly and outwardly and on being cut by the knives E rotating in opposite directions falls across the elevator G, and the root ends of the cane rise from the ground (the frame A being low, about fifteen inches) and come into contact with the belts F F, which carry the ends of the cane clear of the shafts E² and onto the elevators G, at the same time the upper ends of the cane fall on the guides H, which causes the cane to lie lengthwise on the elevators. It is to be understood that the machine is progressing through the field all the time.

Having now particularly described and ascertained the nature of my said invention and in what manner the same is to be performed, I declare that what I claim is—

1. In a machine for cutting sugar-cane, means for dividing a stool of cane into two parts, a gage against which the upper ends of the cane are adapted to abut as the machine is advanced, mechanism coöperative with the gage for cutting off the tops of the cane, and independent mechanism for subsequently cutting off the cane near the ground.

2. In a machine for cutting sugar-cane, means for dividing a stool of cane into two parts, a gage against which the upper ends of the cane are adapted to abut as the machine is advanced, mechanism coöperative with the gage for cutting off the tops of the cane, independent mechanism for subsequently cutting off the cane near the ground, elevators adapted to have a traveling movement, and means for directing the cut cane onto said elevators.

3. In a machine for cutting sugar-cane, means for dividing a stool of cane into two parts, a gage against which the upper ends of the cane are adapted to abut as the machine is advanced, mechanism coöperative with the gage for cutting off the tops of the cane, independent mechanism for subsequently cutting off the cane near the ground, elevators adapted to have a traveling movement, means for directing the cut cane onto said elevators, and means for putting the cane into longitudinal position when it reaches the elevators.

4. In a machine for cutting sugar-cane, a laterally and vertically adjustable spreader arranged to divide a stool of cane into two parts or branches, a gage against which the upper ends of the cane are adapted to abut as the machine is advanced, mechanism coöperative with the gage for cutting off the tops of the cane, and independent means for subsequently cutting off the cane near the ground.

5. In a machine for cutting sugar-cane, means for dividing a stool of cane into two parts or branches, a gage against which the upper ends of the cane are adapted to abut as the machine advances, said gage being rotatably and laterally adjustable, mechanism coöperative with the gage for cutting off the tops of the cane, and independent means for subsequently cutting off the cane near the ground.

6. In a machine for cutting sugar-cane, means for dividing a stool of cane into two parts or branches, a gage against which the upper ends of the cane are adapted to abut as the machine is advanced, means for raising procumbent cane, mechanism coöperative with the gage for cutting off the tops of the cane, and independent mechanism for subsequently cutting off the cane near the ground.

7. In a machine for cutting sugar-cane, cutting mechanism for the tops of the cane having vertically-disposed knives one of which is reciprocatory relatively to another, means for forcing the cane crosswise of said cutting mechanism, and means for subsequently cutting the cane near the ground.

8. In a machine for cutting sugar-cane, ground knives or cutters, two belts over the cutters arranged to travel oppositely to their corresponding cutters, elevators for receiving the cane cut by said cutters, and rods mounted at the entering ends of the elevators and adapted to turn the cane cut by the cutters into a longitudinal position on said elevators.

In witness whereof I have hereunto set my hand in presence of two witnesses.

THOMAS WILSON SLOANE.

Witnesses:
THOMAS JOSEPH COUPLAND,
CHARLES EDWARD GRAHAM.